US011122302B1

(12) United States Patent
Pickens et al.

(10) Patent No.: US 11,122,302 B1
(45) Date of Patent: Sep. 14, 2021

(54) DYNAMIC CONTROLLED-ENVIRONMENT FACILITY RESIDENT MEDIA BROADCASTING SERVICE

(71) Applicant: Securus Technologies, Inc., Carrollton, TX (US)

(72) Inventors: Connor Pickens, Little Elm, TX (US); Alexander Noland, Frisco, TX (US)

(73) Assignee: Securas Technologies, LLC, Carrollton, TX (US)

(*) Notice: Subject to any disclaimer, the term of this patent is extended or adjusted under 35 U.S.C. 154(b) by 0 days.

(21) Appl. No.: 16/676,273

(22) Filed: Nov. 6, 2019

(51) Int. Cl.
| | |
|---|---|
| *H04N 21/214* | (2011.01) |
| *G06Q 50/26* | (2012.01) |
| *H04N 21/262* | (2011.01) |
| *H04N 21/482* | (2011.01) |
| *H04N 21/2187* | (2011.01) |
| *H04N 21/2543* | (2011.01) |
| *H04N 21/436* | (2011.01) |

(52) U.S. Cl.
CPC ........ *H04N 21/2143* (2013.01); *G06Q 50/26* (2013.01); *H04N 21/2187* (2013.01); *H04N 21/2543* (2013.01); *H04N 21/26258* (2013.01); *H04N 21/436* (2013.01); *H04N 21/4825* (2013.01)

(58) Field of Classification Search
None
See application file for complete search history.

(56) References Cited

U.S. PATENT DOCUMENTS

| | | | | |
|---|---|---|---|---|
| 6,774,926 | B1* | 8/2004 | Ellis | H04N 21/4586 348/14.01 |
| 8,929,525 | B1* | 1/2015 | Edwards | H04N 7/147 379/114.21 |
| 10,198,586 | B1* | 2/2019 | Keiser | H04L 63/102 |
| 2011/0238520 | A1* | 9/2011 | Selley | G06Q 30/02 705/26.3 |
| 2013/0110929 | A1* | 5/2013 | Gundotra | H04N 21/4782 709/204 |
| 2014/0033230 | A1* | 1/2014 | Hanna | H04L 67/32 719/313 |
| 2015/0188925 | A1* | 7/2015 | Gupta | H04L 63/0861 726/4 |

(Continued)

*Primary Examiner* — Alexander Q Huerta
(74) *Attorney, Agent, or Firm* — Fogarty LLP

(57) ABSTRACT

Dynamic controlled-environment facility resident media broadcasting services transmit, via a controlled-environment facility local area network, a controlled-environment facility wireless media channel within a controlled-environment facility, playing a playlist available to controlled-environment facility residents to listen to, on respective personal controlled-environment facility resident media devices of the residents. An option for one of the residents to control content of the playlist and/or an option to suggest content for the playlist is offered on the respective personal resident media devices of the residents. Content of the playlist may be adjusted based on suggestions by the residents, such as in response to no resident accepting the offer to control content of the playlist. However, acceptance of the offer to control content of the playlist, from a particular resident results in the particular resident being provided control of the content of the playlist on the personal resident media device of that particular resident.

21 Claims, 4 Drawing Sheets

(56) References Cited

U.S. PATENT DOCUMENTS

2016/0004845 A1* 1/2016 Choudhury ........... H04W 12/06
                                                                726/28
2016/0300409 A1* 10/2016 Peters .................. G06Q 20/145
2017/0273044 A1* 9/2017 Alsina ................... H04L 67/104
2017/0324928 A1* 11/2017 Hodge ................... H04N 7/141
2019/0037247 A1* 1/2019 Hodge ............... H04N 21/4753
2019/0069029 A1* 2/2019 Petty ................. H04N 21/6543

* cited by examiner

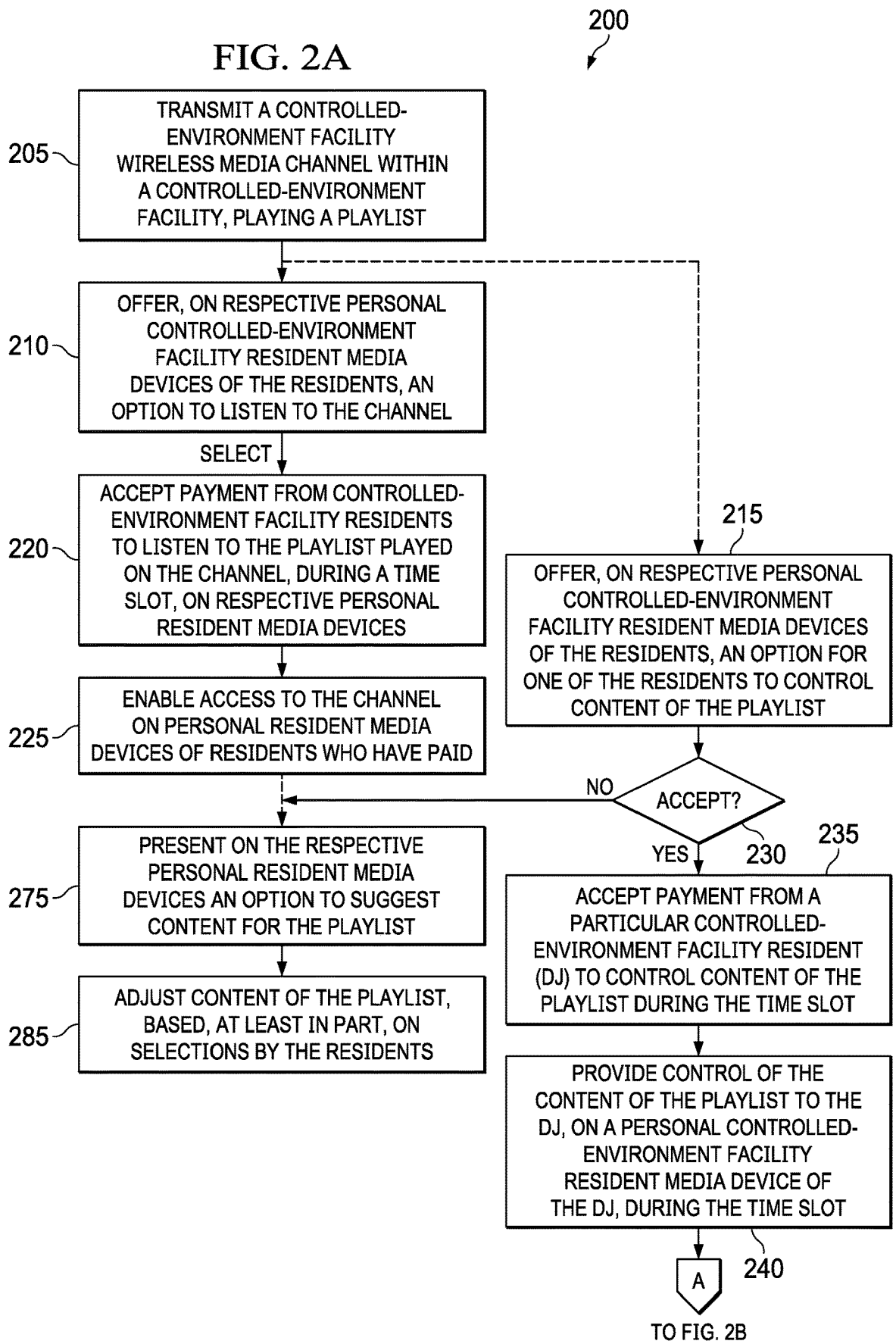

DYNAMIC CONTROLLED-ENVIRONMENT FACILITY RESIDENT MEDIA BROADCASTING SERVICE

TECHNICAL FIELD

The present disclosure relates generally to controlled-environment facilities, more particularly to providing digital media to residents of a controlled-environment facility, via personal controlled-environment resident media devices, and specifically to curating media provided to residents of a controlled-environment facility for play on personal controlled-environment resident media devices.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

Traditional methods for dissemination of entertainment media in controlled-environment facilities have included print libraries, or the like. Typically, residents of controlled-environment facilities, particularly controlled-environment facilities such as correctional institutions, are not allowed access to streaming content. Similarly, unrestricted or untethered access to wireless data communication systems is not typically allowed, such as for security reasons. That is to say, typically, there are security concerns in a controlled environment facility that result in a need for tightly controlled media. Regardless, the cost of streamed or downloaded data, particularly in the form of media files, data plan limits, and/or the cost of bandwidth to download or stream such files, may be a concern. Moreover, the layout of a controlled-environment facility, such as the use or radiating pods in modern correctional facilities, and/or the structure of the facility itself, such as the use of steel and/or steel-reinforced concrete in correctional facilitates, make the propagation of a wireless signal for streaming, or even downloading, difficult and/or unpredictable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide dynamic controlled-environment facility resident media broadcasting services. Wherein, a controlled-environment facility content server, or the like, transmits, via a controlled-environment facility local area network, a controlled-environment facility wireless media channel within a controlled-environment facility, playing a playlist associated with the channel, available to controlled-environment facility residents to listen to (e.g., stream live) on respective personal controlled-environment facility resident media devices of the residents. According to some aspects of the present systems and methods, the controlled-environment facility content server, the controlled-environment facility administration and management system, and/or the like, offer residents an option on the respective personal controlled-environment facility resident media devices of the residents to listen to the channel. In accordance with such aspects, the controlled-environment facility content server, the controlled-environment facility administration and management system, and/or the like, may accept payment from residents to listen to the playlist played on the channel during the time slot on the respective personal controlled-environment facility resident media devices of the residents. The amount of this payment may be based, at least in part, on the time of day of the time slot.

The controlled-environment facility content server, a controlled-environment facility administration and management system, and/or the like, may offer, on the respective personal controlled-environment facility resident media devices of the residents, an option for one of the residents to control content of the playlist.

In response to no resident accepting the offer to control content of the playlist, the controlled-environment facility content server, or the like, offers, on the respective personal controlled-environment facility resident media devices of the residents an option to suggest content for the playlist. In further response to no resident accepting the offer to control content of the playlist, the controlled-environment facility content server, or the like, adjusts content of the playlist, based, at least in part, on selections by the residents to suggest content for the playlist.

However, the controlled-environment facility content server, the controlled-environment facility administration and management system, and/or the like, may receive acceptance of the offer to control content of the playlist during a time slot, from a particular controlled-environment facility resident. According to some aspects, this may include accepting, by the controlled-environment facility content server, the controlled-environment facility administration and management system, and/or the like, payment from the particular resident to control content of the playlist during the time slot. The amount of this payment may be based, at least in part, on the time of day of the time slot. In response to the acceptance of the offer to control content of the playlist during the time slot (and payment), from the particular resident, the controlled-environment facility content server, the controlled-environment facility administration and management system, and/or the like, provides control of the content of the playlist to the particular resident, on the personal controlled-environment facility resident media device of the particular resident, via the controlled-environment facility local area network, during the time slot.

According to some aspects of the present systems and methods, an option may be presented on the personal controlled-environment facility resident media devices of the residents to tip the particular controlled-environment facility resident that is controlling content of the playlist, while the particular resident is controlling content of the playlist. At least a portion of these tip payments may be credited to a media account maintained by the controlled-environment facility administration and management system, or the like, to the benefit of the particular resident that is controlling content of the playlist.

According to some aspects of the present systems and methods, an option may be presented on the personal controlled-environment facility resident media devices of the residents to rate the particular resident that is controlling content of the playlist, while the particular resident is controlling content of the playlist. Received ratings may be stored. Future payment(s) required from the particular resident to control content of the playlist during a future time slot may be adjusted, based, at least in part, on ratings received for the particular resident. In accordance with some aspects of the present systems and methods, a contest between residents of the controlled-environment facility for ratings received while controlling content of one or more playlists may result in adjusting future payment(s) required from a resident that received the highest ratings.

According to some aspects of the present systems and methods, an option to suggest a content selection to the particular resident controlling content of the playlist may be presented on the respective personal controlled-environment facility resident media devices of the residents.

The options to suggest the content of the playlist may include the controlled-environment facility content server selecting at least one suggested content selection and presenting the suggested content selection on the respective personal media devices of the residents. If the playlist is under control of a particular resident, a resident-selected suggestion may be displayed on the personal controlled-environment facility resident media device of the particular resident controlling content of the playlist, for selection by the particular resident, while the particular controlled-environment facility resident is controlling content of the playlist, for play.

Alternatively, or additionally, the options to suggest the content of the playlist may present an interface on the respective personal controlled-environment facility resident media device for entry of the content selection suggestion. According to such aspects of the present systems and methods, entered content selection suggestions may be displayed, on the personal controlled-environment facility resident media device of the particular resident controlling content of the playlist, for selection by the particular controlled-environment facility resident, while the particular controlled-environment facility resident is controlling content of the playlist, for play.

These options to suggest the content of the playlist may also require the resident to pay to suggest content for the playlist In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
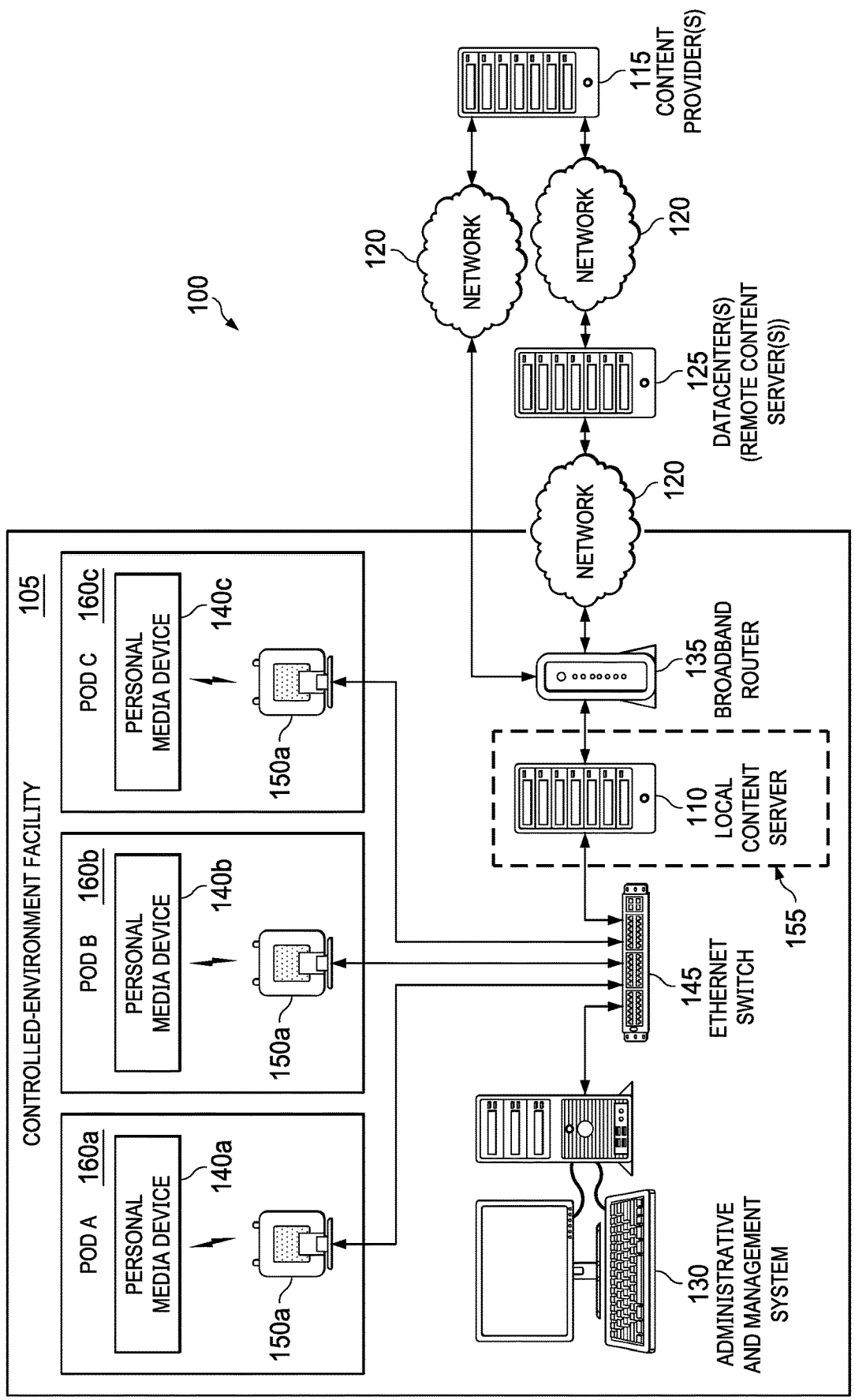
Figure 2B:
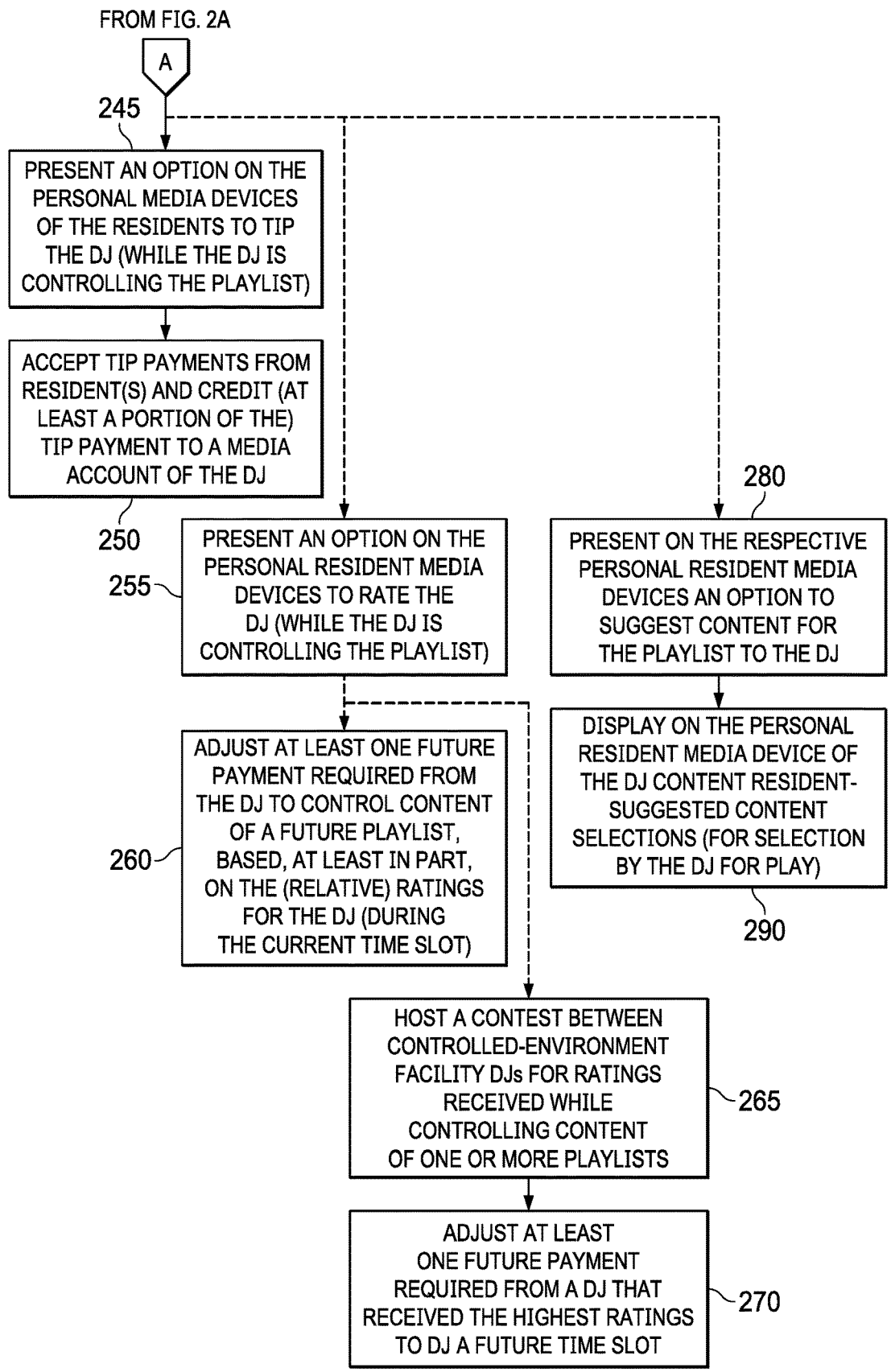
Figure 3:
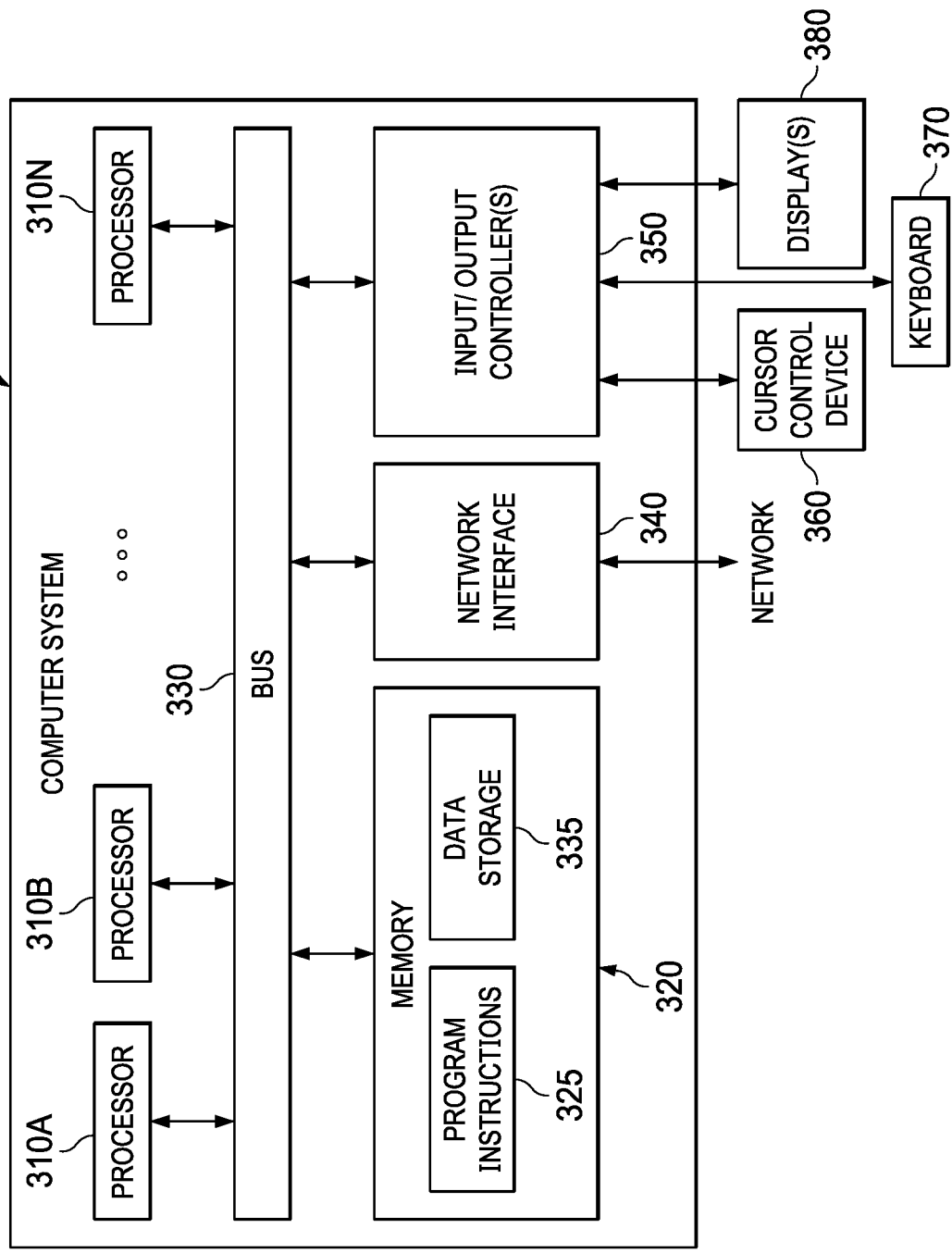

Having thus described the invention in general terms, reference will now be made to the accompanying drawings, which are not necessarily drawn to scale, and wherein:

FIG. 1 is a diagrammatic illustration of an example of an environment where embodiments of the present systems and methods for dynamic controlled-environment facility resident media broadcasting service may be deployed, according to some embodiments;

FIGS. 2A and 2B are partial views intended to form one complete view of a flowchart of an example process implementation for dynamic controlled-environment facility resident media broadcasting service, according to some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods relate generally to controlled-environment facilities, more particularly to providing digital media to residents of a controlled-environment facility, such as via personal controlled-environment resident media devices, and specifically relate to curating (e.g., disc jockeying (DJ'ing)) media provided to residents of a controlled-environment facility for play on personal controlled-environment resident media devices. In accordance with embodiments of the present systems and methods, dynamic controlled-environment facility resident media broadcasting services transmit, via a controlled-environment facility local area network, a controlled-environment facility wireless media channel within a controlled-environment facility, playing a playlist available to controlled-environment facility residents to listen to, on respective personal controlled-environment facility resident media devices of the residents. An option for one of the residents to control (Disc Jockey (DJ)) content of the playlist and/or an option to suggest content for the playlist is offered on the respective personal resident media devices of the residents. Content of the playlist may be adjusted based on suggestions by the residents, such as in response to no resident accepting the offer to control (DJ) content of the playlist. However, acceptance of the offer to control content of the playlist, from a particular resident results in the particular resident (DJ) being provided control of the content of the playlist on the personal resident media device of that particular resident (DJ).

FIG. 1 is a diagrammatic illustration of example environment 100 where embodiments of the present systems and methods for dynamic controlled-environment facility resident media broadcasting service may be deployed, according to some embodiments. Therein, an embodiment of controlled-environment facility digital media distribution, within controlled-environment facility 105, is illustrated as including controlled-environment facility local content server 110 that stores content from content providers 115. Content providers 115 may provide content, or the like as part of a subscription, upon request, etc. Such content may be audio (music, recoded books, etc.) or video, such as instructional or entertainment content. An "outward facing" network connection links controlled-environment facility local content server 110 to at least one content provider 115. Data network 120 may include one or more networks, such as the Internet, a private network (e.g., via a secure tunneling protocol over the internet, using encapsulation), an intranet, or any other type of data network suitable for allowing transfer of digital media from content service provider 115 to local content server 110 and/or datacenter 125. Centralized controlled-environment facility datacenter 125 may handle the request of and/or subscription to the content in a manner conforming to requirements of one or more controlled-environment facilities 105 (i.e., my apply security and/or controls to the request and delivery of a media). Administrative and management (AMS) system 130 may be a controlled-environment facility AMS or functionality, such as a Jail Management System (JMS), or the like, in correctional institution embodiments. Regardless, AMS 130 may provide administration over whether a particular resident can request and/or subscribe to content at all, or content of a particular nature, and/or a particular piece of content (e.g., a particular song or video) or the like. These security and/or control rules may be enforced by local content server 110 (and/or datacenter 125). Local content server 110 may pass the resident request for a particular media on through controlled-environment facility network connectivity, such as broadband router 135 either directly to the media content provider (servers) 115 or through datacenter 125, which, as illustrated, may be external to controlled-environment facility 105. Datacenter 125 may provide the content if the content is hosted in the datacenter, such as in accordance with a license or content subscription agreement. Moreover, datacenter 125 may act as or provide functionality to act as a remote controlled-environment facility content server, such as in place of, or in addition to, local content server 110, in accordance with some embodiments of the present systems and methods.

In accordance with various embodiments of the present systems and methods, AMS 130 and controlled-environment facility local content server 110 may be located at, or in, facility 105, as illustrated in FIG. 1. However, either of controlled-environment facility local content server 110 or AMS 130 may be combined (such as with other facility management systems), and/or located at a central location outside of the facility, disposed in a decentralized manner at several locations, or otherwise located and/or combined so as to receive or provide data communications, in accordance with the present systems and methods. As but one example, controlled-environment facility local content server 110 may be a part of, co-housed with, or co-hosted with, datacenter 125, such as, for example to provide the aforementioned controlled-environment facility remote content server.

Inward facing connectivity from and to controlled-environment facility local content server 110 extends from and to personal controlled-environment resident media devices 140a-140c, such as via Ethernet switch 145 and wireless access points 150a-c. The personal controlled-environment resident media devices 140 may be tablet computing devices, smartphones, media players, or the like, adapted and/or approved for use by residents of controlled-environment facility 105 (within controlled-environment facility 105), as discussed in greater detail below. Local content server 110, which may be referred to as a local platform, or the like, may provide content caching, such as the aforementioned storing of media, or the like. Such caching can promote balanced streaming and/or downloading of content to resident/inmate media devices 140a-c and/or provide for downloading, as resident/inmate media device access to Wi-Fi coverage allows and/or when a resident/inmate media device is interfaced with a communications kiosk, specially adapted video phone and/or the like.

In various embodiments, the controlled-environment facility local content server may determine whether the resident is allowed access to the content and streams the content to the personal resident media device in response to a determination that the resident is allowed access to the content. To this end, the controlled-environment facility local content server may access AMS 130 to determine whether the resident is allowed access to the content. Hence, security and other controls of provisioning of the digital media to a (particular) resident can be implemented at the time of distribution of the digital media to the resident, within the controlled-environment facility. In this manner, latest restrictions, or the like, imposed on a resident can be enforced with respect to the resident. Additionally, or alternatively, security and other controls of provisioning of the digital media to a (particular) resident can be implemented at the time of download and/or storage to local content server 110.

Media downloaded to local content server 110 and then distribution to residents may be licensed for such use or distribution. For example, local content server 110 may merely act as a pass-through for content licensed to a particular controlled-environment facility resident. In such embodiments or situations, the local content server may not retain a copy of the particular licensed copy. In other embodiments, local content server 110 may host copies of various content for distribution as appropriate under a licensing agreement, or the like.

Further, controlled-environment facility local content server 110 may be isolated by firewall 155, and/or otherwise act as a firewall, such as to afford an ability to quarantine and examine incoming digital media files, and/or to ensure control over access to the digital media filed until the determination as to whether the intended resident recipient is allowed access to this content. For example, some downloaded content could include malware, rogue content information, or the like, which would not be approved by the controlled-environment facility content server. Access to such content may be denied, or the content may otherwise be made appropriate for downloading or steaming to the intended resident. For example, embedded inappropriate hyperlinks may be redirected via appropriate DNS redirection security measures.

As noted, communications to or from personal resident media devices is carried out via local network connectivity such as an Ethernet switch 145 and wireless access points 150a-150c, providing a local area network. Communications kiosk, specially adapted videophone and/or the like, may act as wireless and/or wired access points 150a-c for resident/inmate media devices 140a-c. Alternatively, or additionally, access points may be dedicated wired or wireless access points, such as a Wi-Fi router or the like. Hence, the internal controlled-environment facility connectivity may include Wi-Fi connectivity, and in such embodiments a local area network employing the Wi-Fi connectivity includes wireless access points 150a-c, each disposed in corresponding portion 160a-c of the controlled-environment facility to provide access by personal controlled-environment resident media devices disposed in that portion of the controlled-environment facility. For example, where the controlled-environment facility is a correctional facility, the portion of the correctional facility may be a cellblock, pod or common area, such as laundry room, the yard (outside) dayroom cafeteria, exercise facilities or the like. So, in a correctional facility embodiment, a local area network employing the Wi-Fi connectivity may employ wireless access point 150a disposed in pod 160a of correctional facility 105 to provide access by inmate media device 140a, also disposed in pod 160a. Due to the nature of the construction (e.g., steel, steel-reinforced concrete, or the like) and/or layout (e.g., radiating pod structure, or the like) of a correctional facility, coverage from a particular wireless access point (150a), should be contained to the pod (160a) in which it is installed, and hence only reach resident devices (140a) located in that pod (160a), and be more-or-less isolated from devices (140b and 140c) in other pods (160b and 160c).

Streaming and/or downloading may be further compartmentalized by taking advantage of, or employing, antenna directionality of wireless access points 150a-c, signal strength, and/or the like. For example, an authorized transceiver power level may be determined for communicating with the user interface device in response to a request. Additionally, such a system or method may dynamically set a transceiver power in response to the determination. As a further example, a secure network access point may include one or more antennas used for wirelessly communicating with a user interface device, such as the aforementioned resident medias. The one or more antennas may be configured to communicate using a dynamically settable power level. For example, the antenna may be configured to communicate within a first range at a first power level, within a second range at a second power level, and at a third range at a third power level. In addition, the antenna and/or associated RF equipment may be shut off or filtered to terminate communications between the secure network access point and the user interface device. The antenna may be an omnidirectional antenna, a directional antenna, a beam-forming antenna, etc. In some embodiments, the first communication range may be within a few feet of a secure network access point, or even a few inches, requiring the resident to go to a more-or-less or very specific location, such as a communications kiosk, resident phone, classroom, etc. to download and/or stream content. Further security measures may call for determining an authorized duration of network access for the user interface device. Additionally, the method may include establishing a temporary network access session between the user interface device and the network for the authorized duration of network access, and/or temporary access key for network access.

As noted, the personal controlled-environment resident media devices 140a-c may be tablet computing devices, smartphones, media players, or the like, adapted and/or approved for use by residents of the controlled-environment facility (within the controlled-environment facility). Each personal resident media device 140 may be particularly adapted for use in a controlled-environment. For example, in a correctional institution, jail, or the like, such a personal resident media device may have a specially adapted operating system and/or may be "stripped-down," particularly from the standpoint of what applications programs (apps) and/or hardware are provided or allowed on personal resident media device 140, and/or connectivity afforded such a personal resident media device. For example, such a personal resident media device may employ an operating system kernel, such as one based upon an open source platform, which may be rebuilt for use in such a personal resident media device in a controlled-environment facility. As a further example, the personal resident media device may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where streaming and/or downloading may be compartmentalized, leveraging the structure of the controlled-environment facility for example limiting the availability of a Wi-Fi signal providing the stream through the placement of wireless access points, antenna directionality of such wireless access points, and/or the like. Also, the personal resident media device may have a few fixed apps pre-installed on the device, and installation of further apps on the device may be forbidden (i.e., prevented by modifications to the device's operating system, or the like) and/or restricted, such as by requiring permission from a facility administrator, or the like. Apps provided on personal resident media devices might include apps of particular interest to residents of the controlled-environment facility. For example, personal resident media devices provided to inmates of correctional facilities, might include apps that may be of particular use to an inmate, in general, such as access to a legal research service, or of more specific interest, such as providing an inmate nearing release, access to employment searching apps or the like. Hence, such personal inmate media devices may be used to help soon to be released inmates' transition. For example, the personal resident media device may be used to communicate with a future employer, or the like. As such, personal resident media devices may be sponsored, or otherwise subsidized by organizations or companies, assisting with the transition of inmates into society.

FIGS. 2A and 2B are partial views intended to form one complete view of a flowchart of example process implementation 200 for dynamic controlled-environment facility resident media broadcasting service, according to some embodiments. Therein, as applied in environment 100 described above, controlled-environment facility content server (e.g., local content server 110 and/or datacenter 125 operating as a controlled-environment facility content server, as described above), or the like, transmits, at 205, such as via a local area network comprising ethernet switch 145 and wireless access points 150, a controlled-environment facility wireless media channel within controlled-environment facility 105, playing a playlist associated with the channel (live within controlled-environment facility 105).

At 210, controlled-environment facility content server 110, 125, controlled-environment facility AMS 130 and/or the like, offers access to the channel on respective personal controlled-environment facility resident media devices 140 of the residents during a predesignated time slot, or for a particular duration. The resident (inmate) user of the device may be called on to identify themselves for payment and tracking purposes. This may involve a (single) sign in or a log onto the device or into a "radio" an app launched on the resident device. Also, in accordance with various embodiments of the present systems and methods, controlled-environment facility content server 110, 125, controlled-environment facility AMS 130 and/or the like, at 215, offers residents, on the respective personal controlled-environment facility resident media devices of the residents, an option for (at least) one of the residents to control content of the playlist during the time slot, or for a same or other particular duration. In accordance with some embodiments of the present systems and methods, this offer may be only presented to one resident (inmate), by the controlled-environment facility content server, controlled-environment facility AMS, and/or the like, such as, as a reward for good behavior, or the like.

At 220, controlled-environment facility content server 110, 125, controlled-environment facility AMS 130 and/or the like, accepts payment from controlled-environment facility residents to listen to the playlist played on the channel, on respective personal controlled-environment facility resident media devices 140 of the residents, during the time slot and/or for the particular duration. The amount of the payment from the controlled-environment facility residents to listen to the playlist may be is based, at least in part, on the time of day of the time slot, the (remaining) duration, etc. At 225, controlled-environment facility content server 110, 125 and/or a controlled-environment facility AMS 130 enables access to the channel on the personal controlled-environment facility resident media devices (140) of the residents who have paid.

Controlled-environment facility content server 110, 125, controlled-environment facility AMS 130 and/or the like, accepts (further) payment from a particular controlled-environment facility resident to act as a DJ for the playlist, that is, to control content of the playlist during a (e.g., the current) time slot, at 235, in response to acceptance at 230 of the invitation to control the playlist offered at 215. Whereupon, at 240, the controlled-environment facility content server 110, 125, controlled-environment facility AMS 130 and/or the like, provides control of the content of the playlist to the DJ, on the personal controlled-environment facility resident media device (140) of the DJ, via the controlled-environment facility local area network comprising ethernet switch 145 and wireless access points 150, during the (the current) time slot. The payment from the DJ to control content of the playlist may be based, at least in part, on the time of day of the time slot. No such payment may be required when the opportunity to DJ is offered to a resident (inmate) based on good behavior, or the like. Likewise, the offer to DJ, or at least the acceptance of a general offer to DJ, may be conditioned on a disciplinary status, or similar standing of the resident (inmate), with the controlled-environment facility, such as may be maintained by controlled-environment facility AMS 130 and/or the like.

Further, such as once the DJ takes control of the channel playlist at 240, an option may be presented at 245, on the personal controlled-environment facility resident media devices (140) of the residents to tip the DJ (while the DJ is controlling content of the playlist). Such tip payments directed to the (current) DJ may be accepted from one or more of the controlled-environment facility residents, and at least a portion of the tip payment (e.g., the tip payment, less a handling fee to the controlled-environment facility) may be credited to a media account maintained by AMS 130 to the benefit of the (current) DJ at 250. Security measures may be implemented by AMS 130, in accordance with rules and regulations of controlled-environment facility 105 to ensure that such payments are in fact tips paid for the DJ's DJ services and not that such payments are in fact being made for other (nefarious) purposed by the tipping controlled-environment facility resident to the DJ.

Additionally, or alternatively, once the DJ takes control of the channel playlist at 240, an option may be presented on personal controlled-environment facility resident media devices 140 of the residents, at 255, such as through a "radio" app on the resident device, to "rate," "like," or otherwise or "grade" the DJ (while the DJ is controlling content of the playlist). The name of the resident (inmate) DJ is preferably masked, such as by assigning random numbers to the DJ inmate, each time the resident (inmate) DJ's. Ratings should go up or down based on audience feedback.

These ratings or likes from one or more of the controlled-environment facility residents directed to the DJ may be received and stored, such as by controlled-environment facility content server 110, 125, controlled-environment facility AMS 130 and/or the like, in relation to such embodiments, at least one future payment required from the DJ to control content of a playlist during a future time slot, may be adjusted, at 260, based, at least in part, on the (a relative) number of likes, ratings, grades, or the like, received (during a the/particular time slot). With respect to "ratings" or "grades," a resident DJ's ratings or grade may go either up or down, based on resident audience feedback, such as provided through the resident device app. Further, consistent with such embodiments, a contest between DJ residents of the controlled-environment facility for likes, or other ratings, received while controlling content of one or more playlists may alternatively, or additionally, be hosted by the controlled-environment facility at 265, wherein at 270, at least one future payment required from a resident DJ that received the most likes, or highest other ratings, while controlling content of the one or more playlists, may be adjusted to control content of a playlist during a future time slot. Further, "super DJs," or the like, may be determined, in accordance with embodiments of the present systems and methods, based on prior ratings. Such super DJs may be provided exclusive or semi-exclusive opportunities to DJ "prime" time slots, or may be offered some other incentive, within the structure of the rules and regulations of the controlled-environment facility to continue to be a DJ.

At 275, an option to suggest a content selection (e.g., a song or video) is presented on the respective personal controlled-environment facility resident media devices prior to establishment of a DJ at 215 and 235, or if no DJ is established for the channel at 230. Similarly, at 280, an option to suggest a content selection (e.g., a song or video) to a DJ (established at 215 and 235) is presented on the respective personal controlled-environment facility resident media devices of the residents. The option to suggest content selection presented at 275 and/or 280 may include system-suggested content, resulting from controlled-environment facility content server 110, 125, controlled-environment facility AMS 130 and/or the like, selecting, at least one suggested content selection, (based, at least in part, on prior content selections made by the DJ and/or respective resident listener) to be presented at 275 and/or 280 on the respective personal controlled-environment facility resident media devices of the residents for selection. Alternatively, or additionally, in response to selection of the option presented at 275 and/or 280 to suggest a content selection, an interface may be presented on the respective personal controlled-environment facility resident media device of the respective resident for entry of a content selection suggestion. This interface may auto-fill a selection once the resident begins typing. Such selections may be made based on, for example, name of content selection (e.g., song title) type of content selection, genre of content selection (e.g., hip-hop, rock, etc.) performer, song lyrics, author of content selection (e.g., composer), etc.

Suggesting content for the playlist at 275 and/or 280 may require payment. In such embodiments, presentation of the suggestion option may take the form of presentation of an option to pay to suggest content for the playlist and selection of this option may result in presentation of the (actual) option on the respective personal controlled-environment facility resident media device of the respective resident for at least one entry and/or selection of a content suggestion.

At 285, selections by the controlled-environment facility residents made on the respective personal controlled-environment facility resident media devices of the residents (where no DJ has been established) are accepted and controlled-environment facility content server 110, 125 adjust content of the playlist, based, at least in part, on selections by the residents to suggest content for the playlist.

At 290, selections by the controlled-environment facility residents made on the respective personal controlled-environment facility resident media devices of the residents are accepted by controlled-environment facility content server 110, 125, controlled-environment facility AMS 130 and/or the like, and displayed on the personal controlled-environment facility resident media device (140) of the DJ, for selection by the DJ, while the DJ is controlling content of the playlist, for play.

Embodiments of the present systems and methods for dynamic controlled-environment facility resident media broadcasting service, as described herein, may be implemented at least in part as, or executed, at least in part, by one or more computer systems. One such computer system is illustrated in FIG. 3. In various embodiments, computer system 300 may be a server, a mainframe computer system, a workstation, a network computer, a desktop computer, a laptop, a computing device, media player, or the like. For example, in some cases, computer 300 may implement one or more steps of example process 200 described above with respect to FIGS. 2A and 2B, and/or a computer system such as computer system 300 may be used as part of, one or more of local content server 110, content provider 115 content servers(s), datacenter 125 content servers(s), AMS 130, controlled-environment facility resident media devices 140, and/or the like. In various embodiments two or more of these computer systems may be configured to communicate with each other in any suitable way, such as, for example, via networks 120, which may be the Internet, or the like, as discussed above, via a private network, or the like (e.g., via a secure tunneling protocol over the internet, using encapsulation), via a local area network using wired and/or wireless functionality, such as via ethernet switch 145 and/or wireless access points 150, etc.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 and 2. Program instructions 325 may be implemented in various embodiments using any desired programming language, scripting language, or combination of programming languages and/or scripting languages (e.g., C, C++, C#, JAVA®, JAVASCRIPT, PERL®, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing dynamic controlled-environment facility resident media broadcasting service comprising:

transmitting, by a controlled-environment facility content server, via a controlled-environment facility local area network, a controlled-environment facility wireless media channel within a controlled-environment facility, playing a playlist associated with the controlled-environment facility wireless media channel, available to controlled-environment facility residents to listen to on respective personal controlled-environment facility resident media devices of the residents;

offering, by the controlled-environment facility content server and/or a controlled-environment facility administration and management system, on the respective personal controlled-environment facility resident media devices of the residents, an option for one of the residents to control content of the playlist;

accepting, by the controlled-environment facility content server and/or the controlled-environment facility administration and management system, selection by a particular controlled-environment facility resident to control content of the playlist during a time slot;

providing, by the controlled-environment facility content server and/or the controlled-environment facility administration and management system, control of the content of the playlist to the particular controlled-environment facility resident, on the personal controlled-environment facility resident media device of the particular resident, via the controlled-environment facility local area network, during the time slot; and accepting, by the controlled-environment facility content server and/or a controlled-environment facility administration and management system, payment from controlled-environment facility residents to listen to the playlist played on the controlled-environment facility wireless media channel during the time slot on the respective personal controlled-environment facility resident media devices of the residents, an amount of the payment from the controlled-environment facility residents to listen to the playlist based, at least in part, on the time of day of the time slot.

2. The method of claim 1, wherein the playlist is streamed live within the controlled-environment facility.

3. The method of claim 1, further comprising accepting, by the controlled-environment facility content server and/or a controlled-environment facility administration and management system, payment from the particular controlled-environment facility resident to control content of the playlist during the time slot.

4. The method of claim 1, further comprising:
presenting an option on the personal controlled-environment facility resident media devices of the residents to tip the particular controlled-environment facility resident that is controlling content of the playlist, while the particular controlled-environment facility resident is controlling content of the playlist;
accepting tip payments from one or more of the controlled-environment facility residents directed to the particular controlled-environment facility resident that is controlling content of the playlist; and
crediting at least a portion of the tip payment to a media account maintained by the controlled-environment facility administration and management system to the benefit of the particular controlled-environment facility resident that is controlling content of the playlist.

5. The method of claim 1, further comprising:
presenting an option on the personal controlled-environment facility resident media devices of the residents to rate the particular controlled-environment facility resident that is controlling content of the playlist, while the particular controlled-environment facility resident is controlling content of the playlist; and receiving and storing ratings from the controlled-environment facility residents directed to the particular controlled-environment facility resident that is controlling content of the playlist.

6. The method of claim 5, further comprising adjusting at least one future payment required from the particular controlled-environment facility resident to control content of a playlist during a future time slot, based, at least in part, on ratings received.

7. The method of claim 1, further comprising presenting on the respective personal controlled-environment facility resident media devices of the residents an option to suggest a content selection to the particular controlled-environment facility resident controlling content of the playlist.

8. The method of claim 7, wherein presenting the residents the option to suggest the content selection to the particular controlled-environment facility resident controlling content of the playlist further comprises:
selecting, by the controlled-environment facility content server, at least one suggested content selection; and
presenting the at least one suggested content selection on the respective personal controlled-environment facility resident media devices of the residents for selection; and the method further comprising:
accepting selections by the controlled-environment facility residents made on the respective personal controlled-environment facility resident media devices of the residents; and
displaying on the personal controlled-environment facility resident media device of the particular resident controlling content of the playlist, for selection by the particular controlled-environment facility resident, while the particular controlled-environment facility resident is controlling content of the playlist, for play.

9. The method of claim 7, wherein presenting the residents the option to suggest the content selection to the particular controlled-environment facility resident controlling content of the playlist further comprises presenting an interface on the respective personal controlled-environment facility resident media device for entry of the content selection suggestion, and the method further comprises displaying, on the personal controlled-environment facility resident media device of the particular resident controlling content of the playlist, entered content selection suggestions for selection by the particular controlled-environment facility resident, while the particular controlled-environment facility resident is controlling content of the playlist, for play.

10. A method for providing dynamic controlled-environment facility resident media broadcasting service comprising:
transmitting, by a controlled-environment facility content server, via a controlled-environment facility local area network, a controlled-environment facility wireless media channel within a controlled-environment facility, playing a playlist associated with the controlled-environment facility wireless media channel, available to controlled-environment facility residents to listen to on respective personal controlled-environment facility resident media devices of the residents;
offering, by the controlled-environment facility content server and/or a controlled-environment facility administration and management system, on the respective personal controlled-environment facility resident media devices of the residents, an option for one of the residents to control content of the playlist;

accepting, by the controlled-environment facility content server and/or the controlled-environment facility administration and management system, selection by a particular controlled-environment facility resident to control content of the playlist during a time slot;

accepting, by the controlled-environment facility content server and/or a controlled-environment facility administration and management system, payment from the particular controlled-environment facility resident to control content of the playlist during the time slot, an amount of the payment from the particular controlled-environment facility resident to control content of the playlist based, at least in part, on the time of day of the time slot; and providing, by the controlled-environment facility content server and/or the controlled-environment facility administration and management system, control of the content of the playlist to the particular controlled-environment facility resident, on the personal controlled-environment facility resident media device of the particular resident, via the controlled-environment facility local area network, during the time slot.

11. The method of claim 10, wherein the playlist is streamed live within the controlled-environment facility.

12. The method of claim 10, further comprising accepting, by the controlled-environment facility content server and/or a controlled-environment facility administration and management system, payment from controlled-environment facility residents to listen to the playlist played on the controlled-environment facility wireless media channel during the time slot on the respective personal controlled-environment facility resident media devices of the residents.

13. The method of claim 10, further comprising:
presenting an option on the personal controlled-environment facility resident media devices of the residents to tip the particular controlled-environment facility resident that is controlling content of the playlist, while the particular controlled-environment facility resident is controlling content of the playlist;
accepting tip payments from one or more of the controlled-environment facility residents directed to the particular controlled-environment facility resident that is controlling content of the playlist; and
crediting at least a portion of the tip payment to a media account maintained by the controlled-environment facility administration and management system to the benefit of the particular controlled-environment facility resident that is controlling content of the playlist.

14. The method of claim 10, further comprising:
presenting an option on the personal controlled-environment facility resident media devices of the residents to rate the particular controlled-environment facility resident that is controlling content of the playlist, while the particular controlled-environment facility resident is controlling content of the playlist; and
receiving and storing ratings from the controlled-environment facility residents directed to the particular controlled-environment facility resident that is controlling content of the playlist.

15. The method of claim 14, further comprising:
hosting a contest between residents of the controlled-environment facility for ratings received while controlling content of one or more playlists; and
adjusting at least one future payment required from a resident that received the highest ratings while controlling content of the one or more playlists, to control content of a playlist during a future time slot.

16. The method of claim 14, further comprising adjusting at least one future payment required from the particular controlled-environment facility resident to control content of a playlist during a future time slot, based, at least in part, on ratings received.

17. The method of claim 10, further comprising presenting on the respective personal controlled-environment facility resident media devices of the residents an option to suggest a content selection to the particular controlled-environment facility resident controlling content of the playlist.

18. The method of claim 17, wherein presenting the residents the option to suggest the content selection to the particular controlled-environment facility resident controlling content of the playlist further comprises presenting an interface on the respective personal controlled-environment facility resident media device for entry of the content selection suggestion, and the method further comprises displaying, on the personal controlled-environment facility resident media device of the particular resident controlling content of the playlist, entered content selection suggestions for selection by the particular controlled-environment facility resident, while the particular controlled-environment facility resident is controlling content of the playlist, for play.

19. A method for providing dynamic controlled-environment facility resident media broadcasting service comprising:
transmitting, by a controlled-environment facility content server, via a controlled-environment facility local area network, a controlled-environment facility wireless media channel within a controlled-environment facility, playing a playlist associated with the controlled-environment facility wireless media channel, available to controlled-environment facility residents to listen to on respective personal controlled-environment facility resident media devices of the residents;
offering, by the controlled-environment facility content server and/or a controlled-environment facility administration and management system, on the respective personal controlled-environment facility resident media devices of the residents, an option for one of the residents to control content of the playlist;
presenting, by the controlled-environment facility content server, on the respective personal controlled-environment facility resident media devices of the residents, in response to no resident accepting the offer to control content of the playlist, an option to suggest content for the playlist;
adjusting, by the controlled-environment facility content server, in response to no resident accepting the offer to control content of the playlist, content of the playlist, based, at least in part, on selections by the residents to suggest content for the playlist;
receiving, by the controlled-environment facility content server and/or the controlled-environment facility administration and management system, acceptance of the offer to control content of the playlist during a time slot, from a particular controlled-environment facility resident; and
providing, by the controlled-environment facility content server and/or the controlled-environment facility administration and management system, control of the content of the playlist to the particular controlled-environment facility resident, on the personal controlled-environment facility resident media device of the particular resident, via the controlled-environment facility local area network, during the time slot in response to the acceptance of the offer to control content of the playlist during the time slot, from the particular controlled-environment facility resident.

20. The method of claim 19, wherein transmitting the controlled-environment facility wireless media channel further comprises offering, by the controlled-environment facility content server and/or the controlled-environment facility administration and management system, controlled-environment facility residents an option on the respective personal controlled-environment facility resident media devices of the residents an option to listen to the controlled-environment facility wireless media channel and the method further comprises accepting, by the controlled-environment facility content server and/or the controlled-environment facility administration and management system, payment from controlled-environment facility residents to listen to the playlist played on the controlled-environment facility wireless media channel during the time slot on the respective personal controlled-environment facility resident media devices of the residents.

21. The method of claim 19, further comprising accepting, by the controlled-environment facility content server and/or the controlled-environment facility administration and management system, payment from the particular controlled-environment facility resident to control content of the playlist during the time slot.

* * * * *

UNITED STATES PATENT AND TRADEMARK OFFICE
CERTIFICATE OF CORRECTION

PATENT NO. : 11,122,302 B1
APPLICATION NO. : 16/676273
DATED : September 14, 2021
INVENTOR(S) : Connor Pickens et al.

Page 1 of 1

It is certified that error appears in the above-identified patent and that said Letters Patent is hereby corrected as shown below:

On the Title Page

Item [73], delete "Securas Technologies, LLC," and insert -- Securus Technologies, LLC -- therefor.

Signed and Sealed this
Ninth Day of November, 2021

Drew Hirshfeld
*Performing the Functions and Duties of the
Under Secretary of Commerce for Intellectual Property and
Director of the United States Patent and Trademark Office*